(12) United States Patent
Zaidi et al.

(10) Patent No.: US 6,292,882 B1
(45) Date of Patent: Sep. 18, 2001

(54) METHOD AND APPARATUS FOR FILTERING VALID INFORMATION FOR DOWNSTREAM PROCESSING

(75) Inventors: Nazar A. Zaidi, San Jose; Umair A. Khan, Fremont, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/209,094

(22) Filed: Dec. 10, 1998

(51) Int. Cl.[7] .................................................. G06F 9/00
(52) U.S. Cl. ............................. 712/204; 712/23; 712/215
(58) Field of Search .................................. 712/245, 226, 712/212, 248, 23, 210, 204, 215

(56) References Cited

U.S. PATENT DOCUMENTS

| | | | |
|---|---|---|---|
| 5,301,285 | * 4/1994 | Hanawa et al. | 712/212 |
| 5,537,629 | * 7/1996 | Brown et al. | 712/210 |
| 5,581,774 | * 12/1996 | Yoshitake et al. | 712/210 |
| 5,630,083 | * 5/1997 | Carbine et al. | 712/212 |
| 5,673,427 | * 9/1997 | Brown et al. | 712/245 |
| 5,778,246 | * 7/1998 | Brennan | 712/23 |
| 5,822,555 | * 10/1998 | Brown et al. | 712/204 |
| 5,845,100 | * 12/1998 | Gupta et al. | 712/204 |
| 5,867,701 | * 2/1999 | Brown et al. | 712/248 |

* cited by examiner

Primary Examiner—Larry D. Donaghue
(74) Attorney, Agent, or Firm—Blakely, Sokoloff, Taylor & Zafman LLP

(57) ABSTRACT

In one aspect, the invention includes an apparatus for filtering instructions within a digital system that eliminates the need to physically switch the valid instructions onto consecutive data lines of a buffer. The apparatus includes a filter for filtering instructions within a digital system. The filter includes an address generator capable of generating at least two addresses in response to receiving at least two micro-operations. The filter also includes a logic circuit coupled to the address generator. The logic circuit filters addresses corresponding to valid micro-operations in response to assessing the state of a portion of each of the micro-operations. In a second aspect, the invention includes a method for filtering instructions within a digital system that eliminates the need to physically switch the valid instructions onto consecutive data lines of a buffer. The method includes, generating at least two addresses in response to receiving at least two micro-operations. The method further includes filtering addresses corresponding to valid micro-operations in response to assessing the state of a portion of each of the micro-operations.

30 Claims, 7 Drawing Sheets

METHOD AND APPARATUS FOR FILTERING VALID INFORMATION FOR DOWNSTREAM PROCESSING

FIELD OF THE INVENTION

The invention relates in general to the field of digital systems and, more particularly, to filtering within digital systems. Specifically, the invention relates to a method and apparatus to filter instructions within a digital system.

DESCRIPTION OF THE RELATED ART

With the growing complexity of modern computer systems, designers are constantly seeking more efficient methods to increase the speed at which instructions are executed within a computer system. Many modern computer systems utilize parallel processing, which allows the simultaneous execution of numerous instructions. An instruction (e.g., a macro-instruction) may be decoded into one or more simple micro-operations (e.g., micro-instructions) that are sometimes referred to as "μops" or "uops". It is these micro-operations that may be simultaneously executed in a parallel processor.

FIG. 1 illustrates a portion of a processor 100 with a front end 105 that receives instructions, e.g., macro-instructions. The instructions are sent to a conversion stage 115 via the path 108. The conversion stage 115 may be designed to convert the macro-instructions on the line 108 to simple micro-operations that are sent to the back end 110 via the path 109. The conversion stage 115 may include an expansion circuit 120, a decoded number generator 124, and a buffer 122, as well as other components to provide the desired conversion. When an instruction (e.g., a macro-instruction) enters the conversion stage 115, the instruction is generally sent to a stage where the instruction is identified in a table. For each instruction within this table, there may be several corresponding complex micro-operations, also referred to as "cuops".

Typically, one macro-instruction may generate up to three complex micro-operations, two of which may be further expanded. Generally, the complex micro-operations are sent to the expansion circuit 120 where one or more simple or expanded micro-operations "euops" are generated from each of the complex micro-operations. For example, the expansion circuit 120 may generate as many as four euops from one complex micro-operation. Often, the other complex micro-operation translates directly into an euop.

Still referring to FIG. 1, these euops may be stored in a buffer 122 until needed by the other components. The decoded number generator 124 enables the euops to be manipulated faster by the other components by converting information related to the euops, such as their associated addresses, to decoded numbers. Generally, a decoded number is a converted binary number comprising all zeros and only one "1". For example, the 8-bit binary number 00000011 (i.e., decimal number 3) corresponds to decoded number 00001000. Generally, in a decoded number, a one in the least significant bit represents decimal 0, a one in the next bit represents decimal 1, a one in the next bit represents decimal 2, a one in the next bit represents decimal 3, and so on. Therefore, as the decimal number increases, the number of bits required to represent the decoded number increases.

For example, the binary number 0011 may correspond to the address for an euop to be stored in the buffer 122. The binary number 0011 would be converted to the decoded number 1000 after traversing the decoded number generator 124. The euop is written to the buffer address corresponding to the decoded address which, here, is 1000.

FIG. 2 is an enlarged diagram of the expansion circuit 120 and the buffer 122. The expansion circuit 120 includes two individual expanders 200, 210 that are designed to receive micro-operations including cuops along the paths 220, 224, respectively. One skilled in the art will appreciate that each path 220, 224 may consist of multiple lines. The expanders 200, 220 are configured to respectively apply a plurality of euops to the lines 201–205, 206–209, respectively, in response to expanding the micro-operations applied to the paths 220, 224, respectively.

Typically, a logic circuit is placed between the expansion circuit 120 and the buffer 122. Here, the logic circuit is placed between the decoded number generator 124 and the buffer 122. The logic circuit provides the addressing desired in order for the euops applied to the lines 201–209 to be properly stored in the buffer 122. This logic circuit is shown in FIG. 2 as a buffer address circuit 230, which receives and routes euops to a particular location in the buffer 122 via the lines 231–239. The buffer address circuit 230 receives decoded addresses from the decoded number generator 124 and routes the corresponding euops to the entry in the buffer 122 indicated by the decoded address. Typically, buffers utilize head pointers that indicate the starting position (e.g., the cell) where the next set of data should be written. When data is written (i.e., stored), it normally begins at the cell indicated by the head pointer and proceeds down sequentially (e.g., head pointer plus one, head pointer plus two, etc.). The buffer address circuit 230 receives the head pointer along the line 240 and uses this information to assign cells in which to store the euops.

Still referring to FIG. 2, if the micro-operations applied to the paths 220, 224 expand to five and four euops, respectively, each of the cells 251–259 would contain valid data. Therefore, when the cells 251–259 are read, each of them would include valid data corresponding to the expanded micro-operations (euops) received on paths 201–209.

If, however, the micro-operation received on the line 220 is expanded into only two simplified micro-operations (euops) that are applied to the lines 201–202, the lines 203–205 will remain unused. Assuming that everything else is identical to the previous example, the cells 251–252, 256–259 would contain the latest set of data. Because the lines 203, 204, and 205 were not used (since the corresponding micro-operations could not be expanded) the cells 253, 254 and 255 would contain invalid data. This invalid data is hidden in between the valid data found in the cells 251–252, 256–259. Therefore, when the values in cells 251–259 are read out, invalid data in the cells 253, 254 and 255 is sent to other portions of the system along with the correct data. The transmission of invalid data may cause other stages in the computer system to malfunction. In addition, these holes (ie., non-utilized portions of the buffer) may also be problematic. Larger buffers may be needed in order to account for the resulting holes. This increases the cost and decreases the performance of the system. Each of these problems may be intensified as the number of non-utilized cells increases. Thus, FIG. 2 shows what would happen if valid and invalid micro-operations were written to consecutive address locations in the buffer 122.

Some prior methods filtered the invalid data from the valid data prior to writing the valid data to the buffer. This eliminated the holes in the buffer but required extra logic, and thus extra chip space, to accomplish this result.

The prior method placed valid data in consecutive entries in the buffer, starting from the head pointer location, by using datapath muxing. For example, in a system producing nine uops per clock cycle, some valid, some invalid, a 9:1 mux could be used to select the first valid uop in the input set of uops 1–9. A second 8:1 mux could be used to select the second valid uop. A third 7:1 mux could be used to select the third valid uop. A fourth 6:1 mux could be used to select the fourth valid uop. A fifth 5:1 mux could be used to select the fifth valid uop. A sixth 4:1 mux could be used to select the sixth valid uop. A seventh 3:1 mux could be used to select the seventh valid uop. An eighth 2:1 mux could be used to select the eighth valid uop, and the ninth uop could be sent directly to a logic circuit to determine whether the ninth uop was valid.

Datapath muxing, however, presents problems in terms of chip space and speed. The processor speed is limited because of the complexity of the control logic and the number of transistors required for datapath muxing, and because of the number of control and data signals that must be routed to the plurality of muxes. These speed and area limitations are especially prohibitive when dealing with, for example, nine buses having in excess of 150 bits per bus.

Thus, it would be beneficial to have an improved technique for efficiently filtering valid instructions from invalid instructions which overcomes the shortcomings of conventional methods.

SUMMARY OF THE INVENTION

In one aspect, the invention includes an apparatus for filtering instructions within a digital system that eliminates the need to physically switch the valid instructions onto consecutive data lines of a buffer. The apparatus includes a filter for filtering instructions within a digital system. The filter includes an address generator capable of generating at least two addresses in response to receiving at least two micro-operations. The filter also includes a logic circuit coupled to the address generator. The logic circuit filters addresses corresponding to valid micro-operations in response to assessing the state of a portion of each of the micro-operations.

In a second aspect, the invention includes a method for filtering instructions within a digital system that eliminates the need to physically switch the valid instructions onto consecutive data lines of a buffer. The method includes, generating at least two addresses in response to receiving at least two micro-operations. The method further includes filtering addresses corresponding to valid micro-operations in response to assessing the state of a portion of each of the micro-operations.

BRIEF DESCRIPTION OF THE DRAWINGS

Other objects and advantages of the invention will become apparent upon reading the following detailed description and upon reference to the drawings in which.

Figure 1:
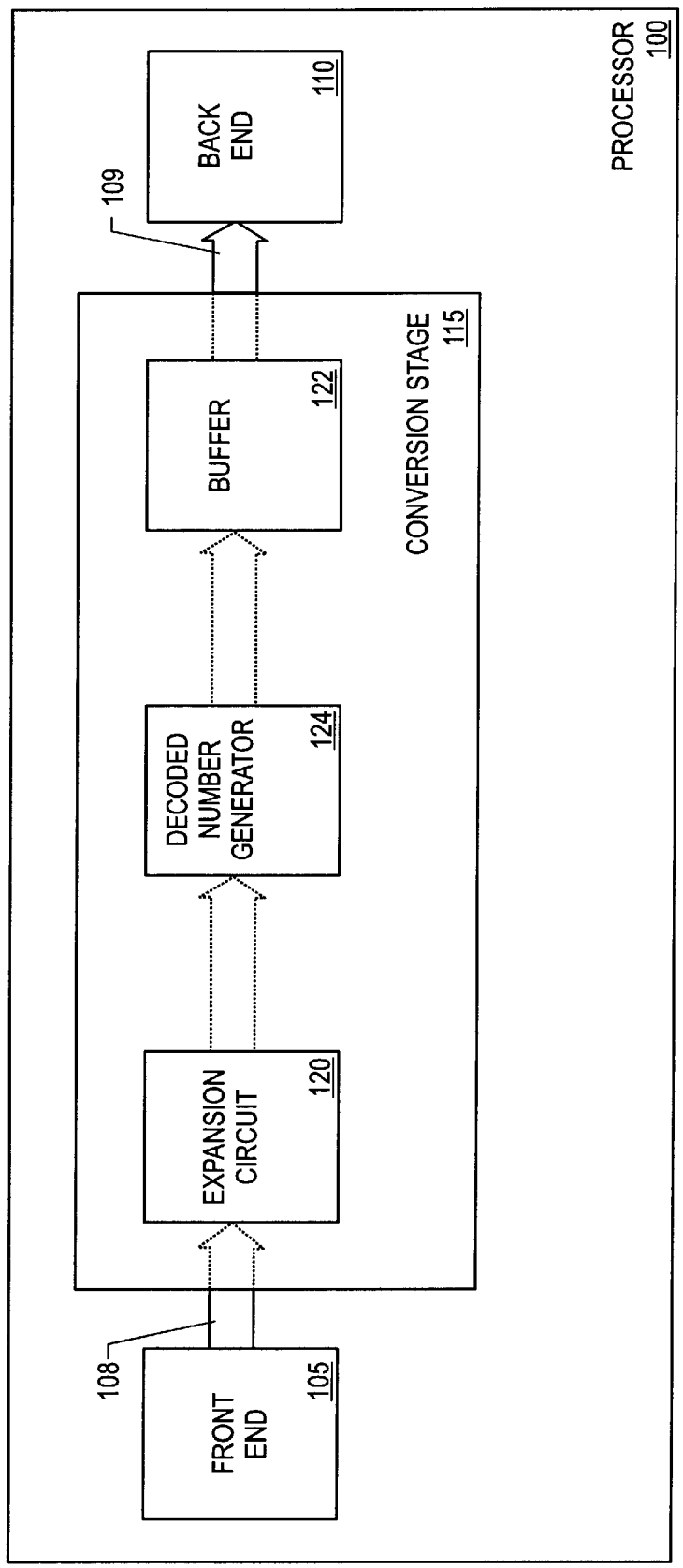
FIG. 1 is a partial block diagram of a prior art processor.
Figure 2:
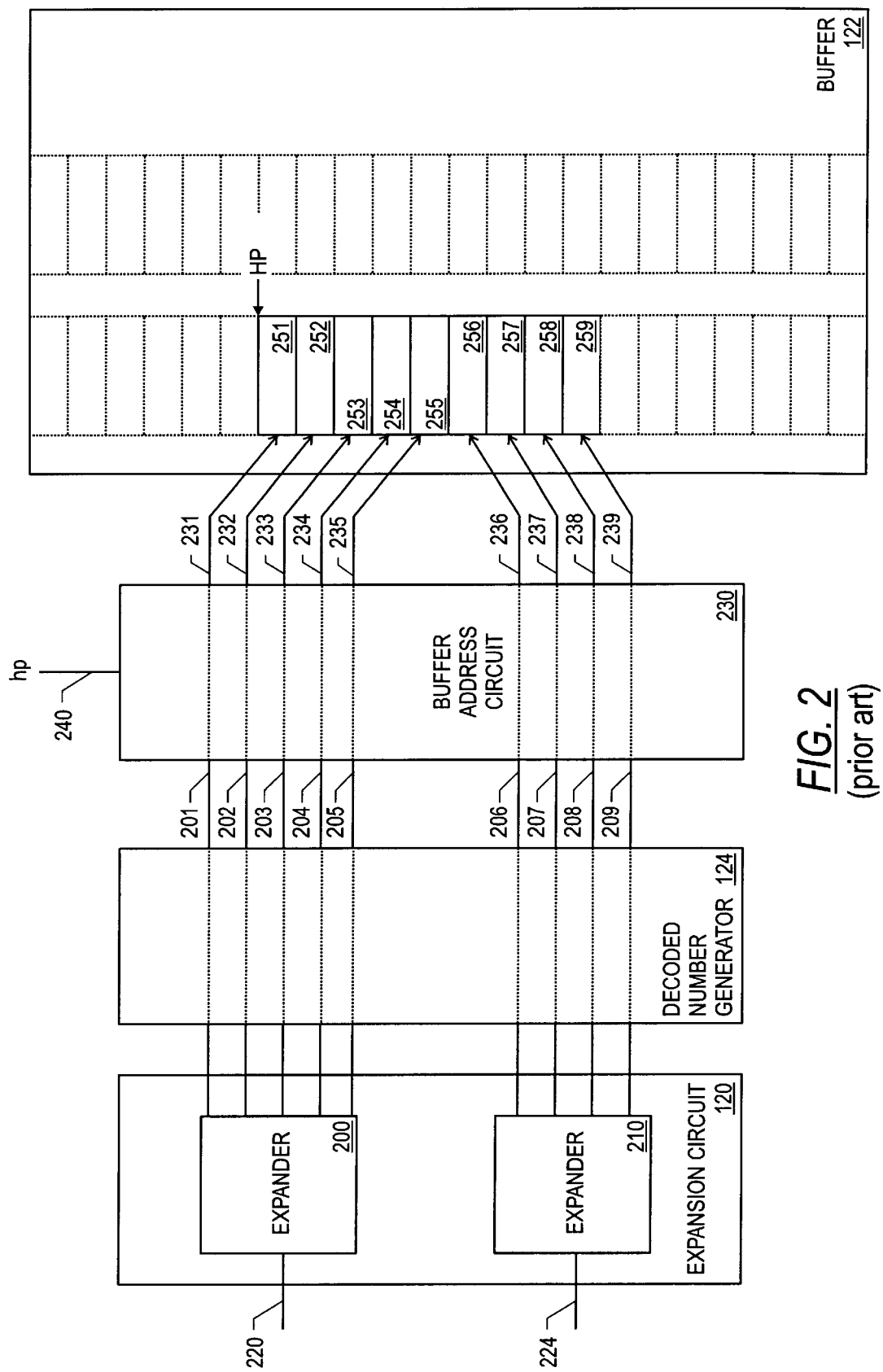
FIG. 2 is a more detailed diagram of some of the elements in the prior art processor of FIG. 1.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a method and apparatus to filter instructions. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

Figure 3:
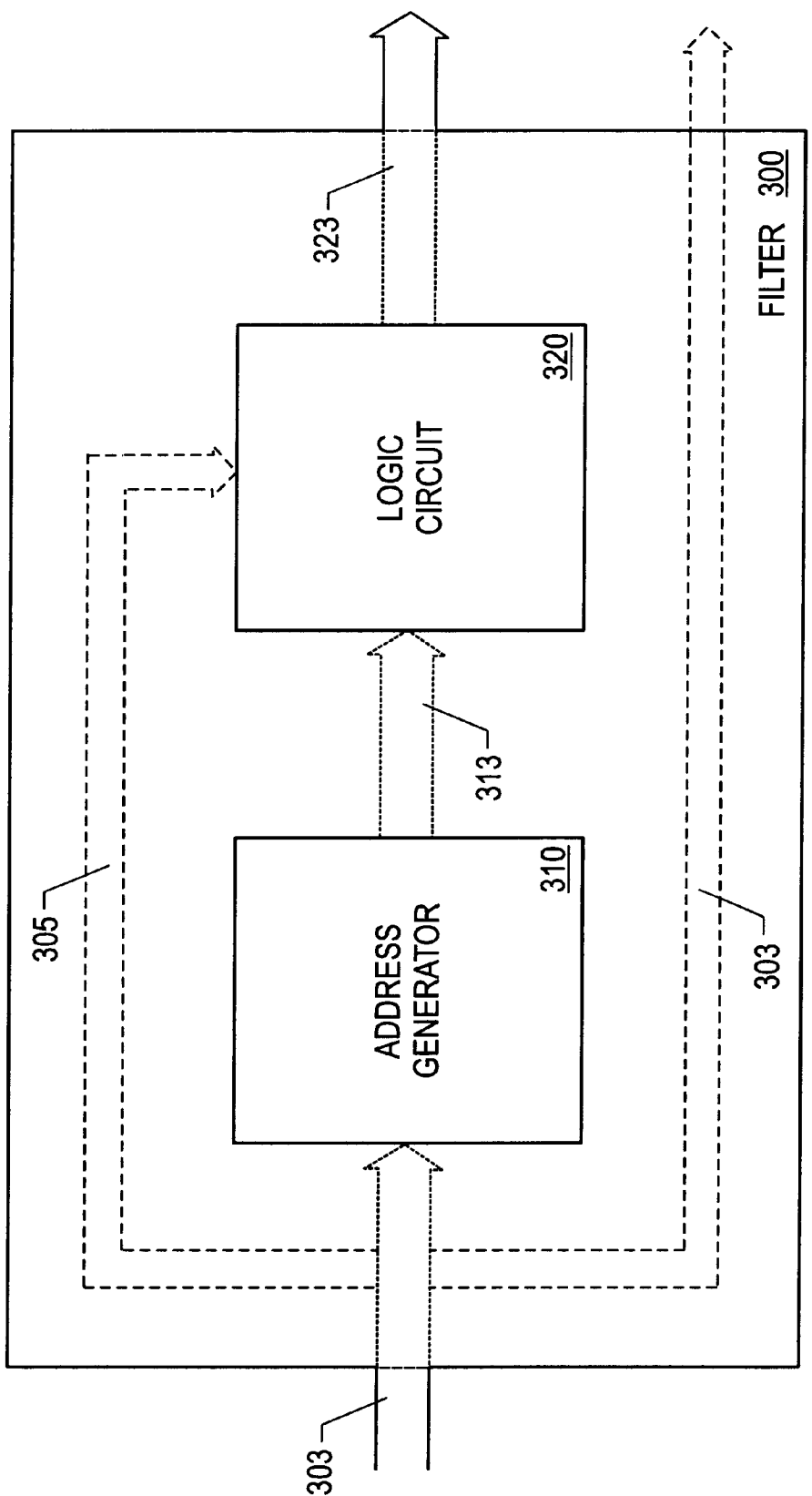
FIG. 3 is a simplified block diagram of a filter according to the present invention.

FIG. 3 illustrates one particular embodiment of a filter 300 in accordance with the invention that includes an address generator 310 and a logic circuit 320. In the embodiment illustrated, the filter 300 eliminates the need for muxes that physically switch the valid micro-operations onto consecutive data lines of, for example, a buffer. The filter 300 receives micro-operations along the path 303, which are sent to the address generator 310. Micro-operations as used from this point on generally refers to simple or expanded micro-operations (euops), unless otherwise specified. The address generator 310 produces addresses for the micro-operations received along the path 303. The addresses are sent to the logic circuit 320 along the path 313. At least a portion of the micro-operations are sent to the logic circuit 320 along the path 305.

The logic circuit 320 filters the micro-operations received along the path 303 by assessing the logic state of at least a portion of the values within the micro-operation. In one embodiment, at least the valid bit of each micro-operation is assessed. After each micro-operation is assessed, decoded addresses are generated. These decoded addresses are passed via the path 313 to a logic circuit that enables addresses corresponding to valid micro-operations to be passed to, for example, a buffer via the path 323. The valid micro-operations are written to the buffer via the path 303. Therefore, the incoming micro-operations have a fixed connection to the data lines of, for example, a buffer. The logic circuit 320 filters the invalid micro-operations based solely on evaluating a portion of each of the incoming micro-operations. The present invention thus provides an efficient method and apparatus for filtering addresses corresponding to valid micro-operations and sending the valid addresses to, for example, a buffer.

Specific Embodiments

Figure 4:
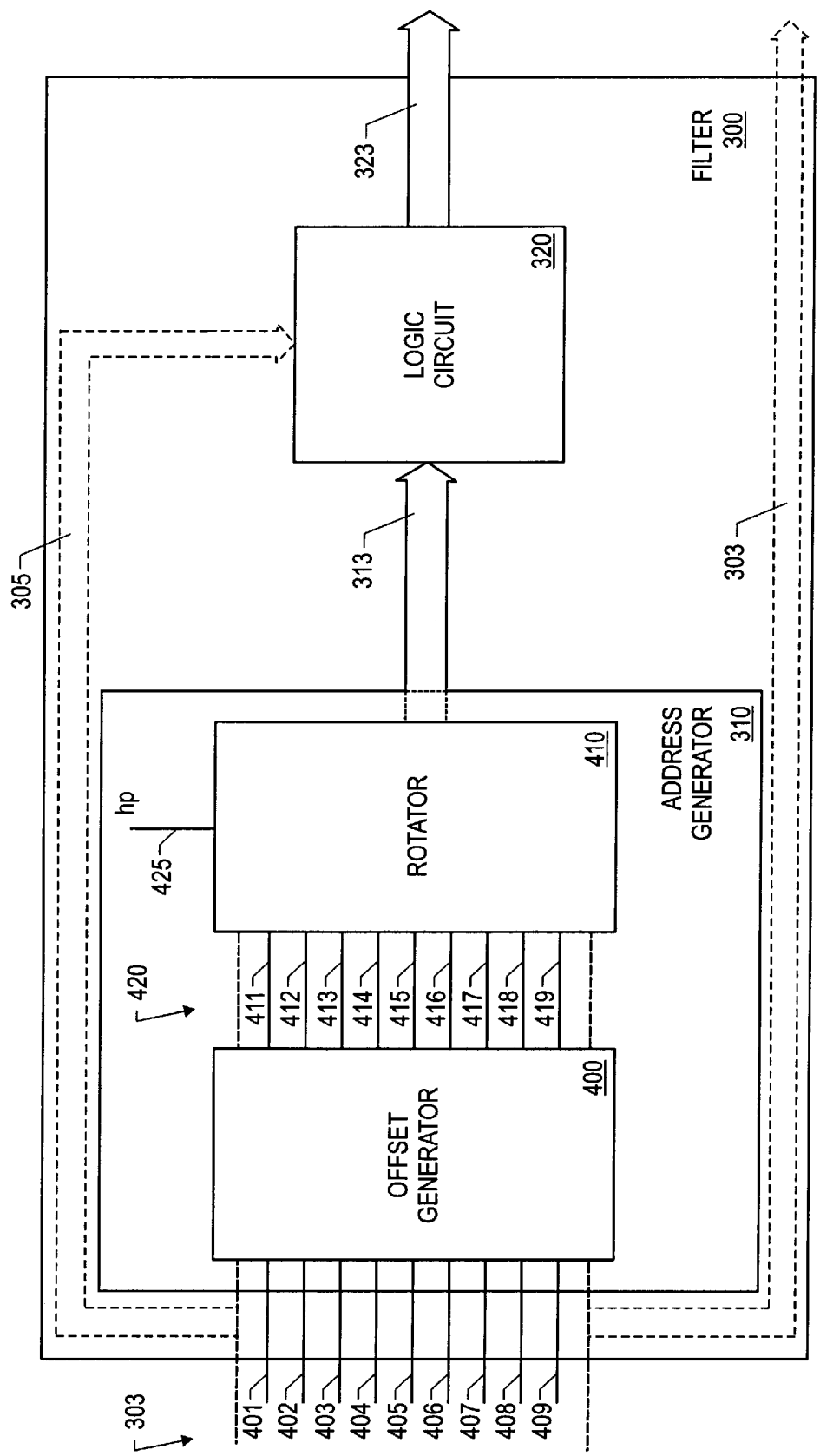
FIG. 4 is a more detailed block diagram of the filter of FIG. 3.

In accordance with the present invention, FIG. 4 illustrates a more specific block diagram of one particular embodiment for the filter 300. The address generator 310 includes an offset generator 400 and a rotator 410. The offset generator 400 receives the micro-operations sent to the address generator 310 along the path 303. For each micro-operation received, the offset generator 400 generates a corresponding offset that is sent to the rotator 410 along the path 420. The offset equals the number of valid micro-operations that preceded the current micro-operation.

Micro-operations generally contain multiple bits, one of which may be referred to as the valid bit. Typically, the valid bit indicates if the micro-operation contains valid data. For example, if the valid bit is logic 1, this indicates that this micro-operation is valid. Valid micro-operations are sent to the back end of the system for execution. Alternatively, if the valid bit is logic 0, this indicates that the micro-operation contains invalid data. Additional specifics regarding the generation of valid bits have not been included so as not to obscure the present invention.

Therefore, instead of using the conventional method of datapath muxing to assign valid micro-operations to sequential address locations in a buffer, the present invention uses an improved method that employs simplified logic. The inventive technique uses the offset generator 400 to sum the valid bits of previous micro-operations to produce the offset. The offset is added to the head pointer by the rotator 410. The resulting decoded address is sent via path 313 to a logic circuit 320 that filters addresses corresponding to valid micro-operations from addresses corresponding to invalid micro-operations. The valid addresses are used to sequentially write valid micro-operations to, for example, a buffer.

In one embodiment, the path 303 contains nine conductive lines 401–409 for nine micro-operations (uop1–uop9). For each of the micro-operations, the offset generator 400 generates an offset equal to the number of valid micro-operations that preceded the current micro-operation. The offset is calculated by adding the valid bits for each preceding micro-operation. For example, if uop4 is on line 404, then the offset generator 400 applies the corresponding decoded offset to line 414. This offset is equal to the sum of valid bits from uops 1–3 that were applied to lines 401–403, respectively. Thus, if the current micro-operation being processed is uop4, and the valid bits for the micro-operations on lines 401–403 are 1–0–1, respectively, then the offset for uop4 would be two (1+0+1). This offset is applied, as a decoded number, to the line 414. Offsets for the remaining micro-operations are calculated in the same manner.

The rotator 410 functions as a modular-16 adder. It produces decoded addresses for each of the received micro-operations by modularly adding the offsets received along the path 420 to a head pointer received along the line 425. A rotator is a shift register that provides "wrap around" (ie., the most significant bit is rotated to the least significant bit). For example, if binary 15 and binary 1 were added to give binary 16, a rotator would wrap around the most significant bit so that the rotator contains a binary 1. The decoded address on line 313 determines the actual address location in the buffer (not shown) where the current micro-operation will be written, if it is valid. If the buffer is a 16-entry buffer, the rotator 410 is a 16-bit rotator that receives a 16-bit head pointer on the line 425. The address location in the buffer where the current micro-operation (uop4) will be written, if it is valid, corresponds to the sum of the head pointer and the offset.

Thus, for example, if the head pointer is pointing to address location five and the offset from line 414 is two, then uop4 will be written to address location seven, if it is valid. The rotator 410 modularly adds the offset to the head pointer as follows: The offset indicates how many bits to rotate left. For example, if the offset is two and the head pointer is five, the rotator rotates all the current bits to the left two bits. Five in modular-16 is 0000000000100000, two in modular-16 is 0000000000000100. Therefore, by shifting the bead pointer (5) by the offset (2), the result is seven in modular-16 (0000000010000000). One skilled in the art having the benefit of this disclosure will appreciate that one implementation of the rotator 410 may be a simple multiplexer.

To determine whether the micro-operation is valid, the decoded addresses are sent to the logic circuit 320 along the path 313 and at least the valid bit of each corresponding micro-operation is sent to the logic circuit 320 along path 305. The logic circuit 320 is used to filter valid micro-operations from invalid micro-operations. The logic circuit 320 accomplishes this task by assessing the logic state of at least the valid bit and using this state to limit the passage of invalid micro-operations. Thus, the logic circuit 320 only applies the addresses of valid micro-operations to the path 323. The corresponding micro-operations may be sent to a storage device (e.g., a buffer) via path 303.

For example, in one embodiment, the logic circuit 320 only allows the addresses of valid micro-operations to pass by ANDing the valid bit of the current micro-operation with its corresponding decoded address. Each buffer entry has an active high write enable. Thus, if the micro-operation is valid (i.e., has valid bit equal to logic 1), the decoded address (containing one logic 1) is passed to the buffer thus allowing the micro-operation to be written via path 303 to the appropriate entry in that buffer. If, however, the micro-operation is invalid (i.e., has valid bit equal to logic 0), the address sent to the buffer will be all zeros. Thus, none of the entries in the buffer will be enabled and the invalid micro-operation will therefore not be written to the buffer.

Figure 5:
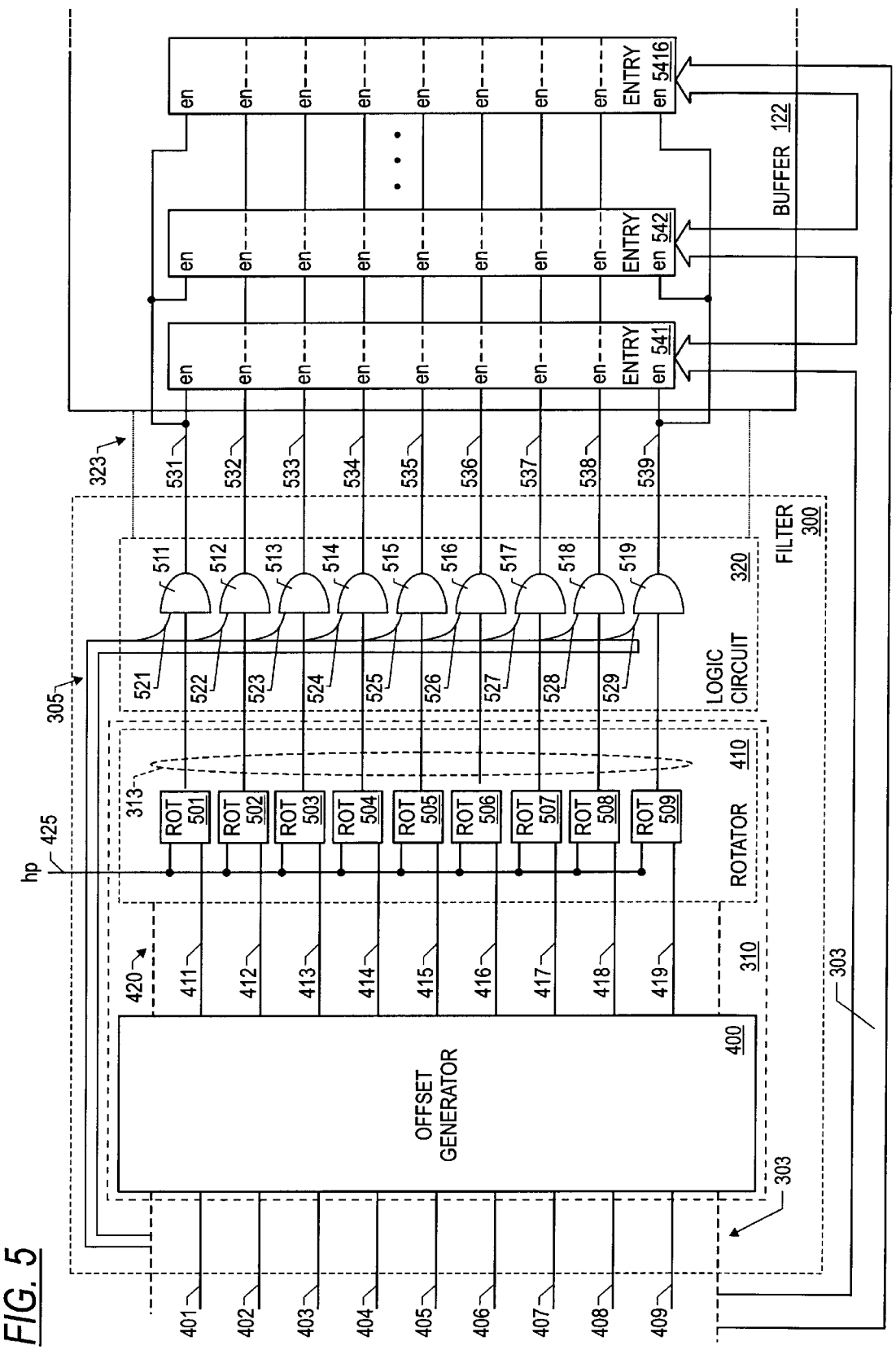
FIG. 5 is a partial circuit diagram for a system including a filter and a buffer according to the present invention.

FIG. 5 illustrates one embodiment of a portion of a digital system including a filter 300 and a buffer 122, according to the present invention. The filter 300 includes the offset generator 400 and the rotator 410. The illustrated rotator 410 includes nine constituent rotators 501–509 coupled to the lines 411–419, respectively. The filter 300 further includes the logic circuit 320, which is shown as nine individual AND gates 511–519 coupled to the rotators 501–509, respectively. One skilled in the art having the benefit of this disclosure will appreciate that the number and type of individual rotators and logic gates may vary depending on the number of input lines (e.g., the lines 401–409) to the filter 300 and the design implementation.

In the exemplary embodiment of FIG. 5, the nine AND gates 511–519 have respective input terminals 521–529. Each AND gate 511–519 is respectively coupled to the nine rotators 501–509. Each of the input terminals 521–529 is respectively connected to one line from each 16-bit bus 401–409 so that the valid bit from each micro-operation may be assessed by the logic circuit 320. An AND gate input terminal receiving a valid bit equal to logic 1 is enabled and thus passes the decoded 16-bit address to the buffer 122 via path 323. This configuration is shown for one buffer entry 542. One skilled in the art will appreciate that this configuration may be repeated for the remaining buffer entries not shown.

Figure 6:
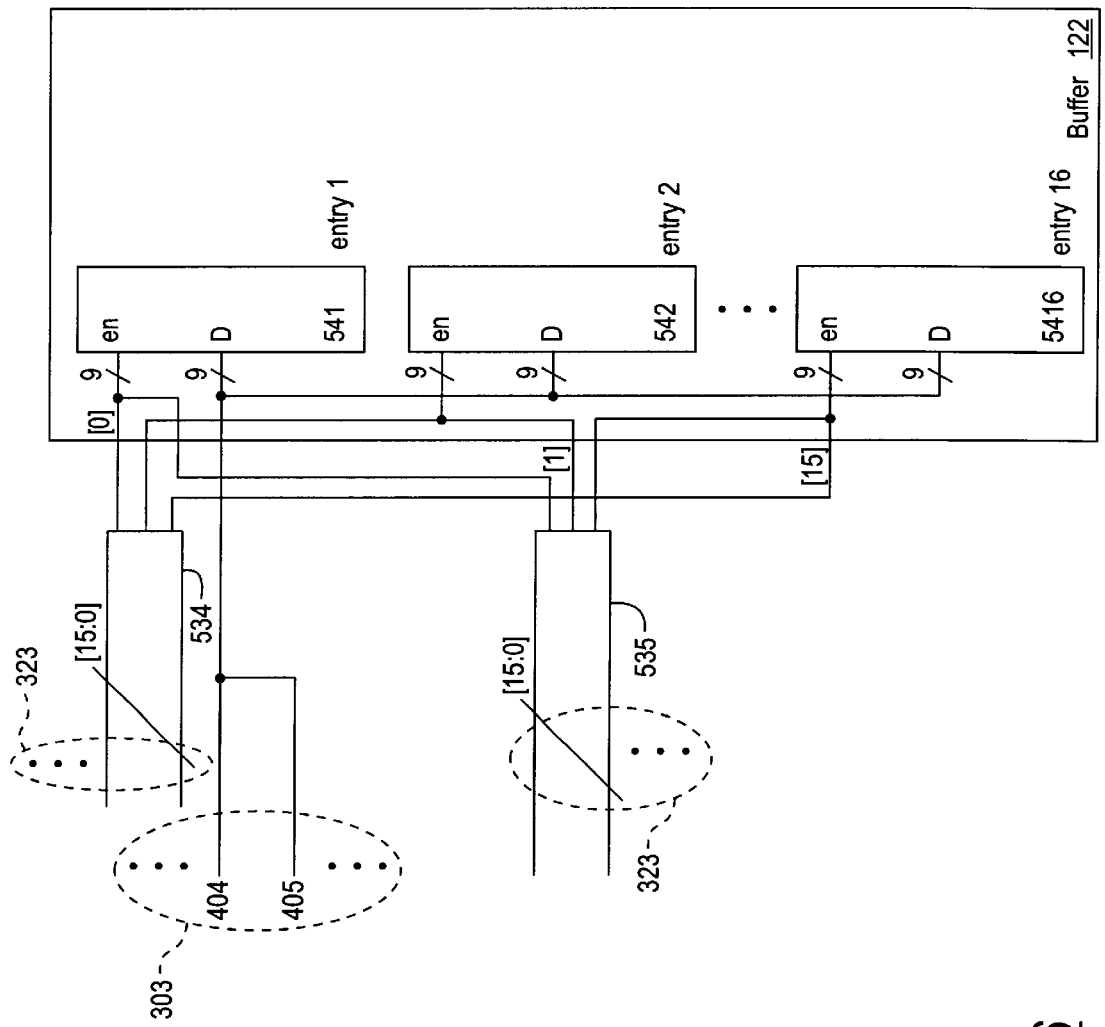
FIG. 6 is a partial circuit diagram for a system including a buffer according to the present invention.

In one exemplary embodiment, the buffer 122 includes 16 nine-port buffer entries each having nine enable latches. Each enable latch is connected to one bit from each of the 16-bit address buses 531–539. For example, as illustrated in FIG. 6, the enable for entry 1 is connected to bit 0 from each of the nine 16-bit address buses, the enable for entry 2 is connected to bit 1 from each of the nine 16-bit address buses, . . . , and the enable for entry 16 is connected to bit 15 from each of the nine 16-bit address buses. The data lines 401–409 for the nine micro-operations (uop1–uop9) are connected to the respective data port for each entry. The decoded address from one of the address buses 531–539 enables one of the 16 entries. Thus, the current micro-operation is written to the appropriate entry via path 303. For example, if buffer entry 542 corresponds to entry number 2 and the decoded address on the 16-bit address bus 534 is 0000000000000100 (which in decoded modular-16 is 2), then the entry would be enabled and the data (i.e., the current micro-operation on line 404) would be written to entry number 2 (buffer entry 542). FIG. 6 only illustrates the storage of one data bit (e.g., bit zero) in one cell (e.g., buffer entry 542). Yet, the buffer entry 542 may be designed to store multiple data bits within a given entry (ie., the buffer entry may be multiple bits wide).

Figure 7:
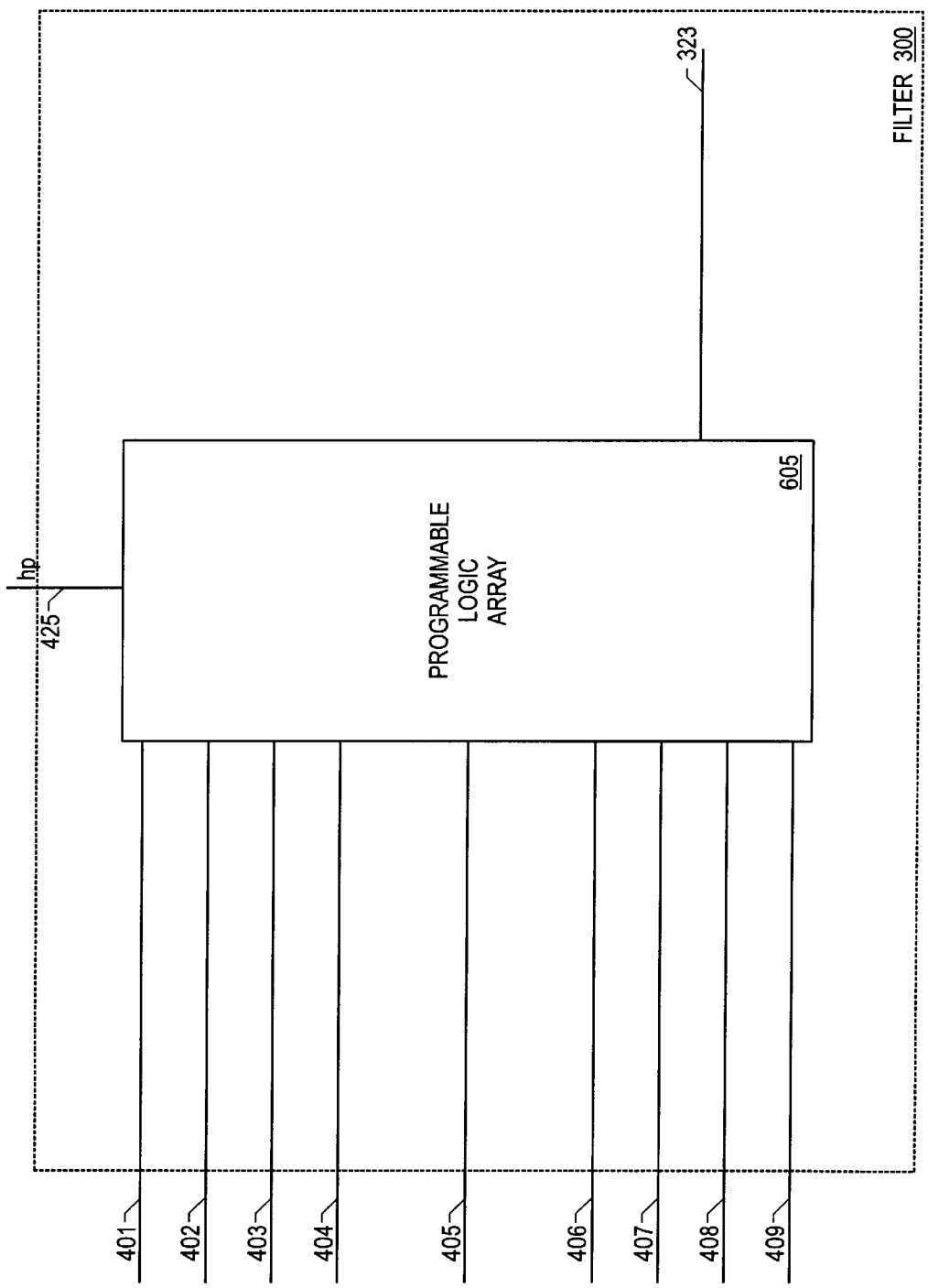
FIG. 7 is partial circuit diagram showing the filter of FIG. 3 implemented in a PLA.

FIG. 7 illustrates that the present invention may be implemented in a programmable logic array (PLA) 605. In this embodiment, the function of the filter 300 is implemented in the PLA 605. The PLA 605 receives the micro-operations applied to the lines 401–409 and the head pointer applied to line 425. The PLA 605 generates the desired offset and adds that offset to the head pointer to produce the decoded addresses. The decoded addresses are processed by the logic circuit and valid micro-operations are then written to consecutive address locations in, for example, a buffer.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A filter comprising:
    an offset generator, said offset generator to generate at least two offsets in response to receiving a valid bit from at least two micro-operations;
    a rotator coupled to said offset generator to generate at least two addresses in response to receiving said offsets and said head pointer; and
    a logic circuit coupled to said rotator to filter said micro-operations in response to assessing the state of the corresponding valid bits.

2. The filter of claim 1, wherein said offset generator further includes an adder to generate said offsets in response to receiving said micro-operations.

3. The filter of claim 1, wherein said rotator includes a plurality of constituent rotators, each of said constituent rotators receives one of said offsets along a conductive media.

4. The filter of claim 1, wherein said offset generator, said rotator and said logic circuit are implemented in a programmable logic array to generate said addresses in response to receiving said micro-operations and a head pointer.

5. A processor capable of filtering valid micro-operations from invalid micro-operations, said processor comprising:
    an offset generator to generate a plurality of offsets in response to receiving a valid bit from each of said micro-operations;
    a rotator to generate a plurality of addresses corresponding to each of said micro-operations in response to receiving said offsets and said head pointer, wherein said rotator is coupled to said offset generator, and receives a head pointer;
    a buffer having a plurality of entries wherein each said buffer receives said valid micro-operations; and
    a logic circuit coupled between said rotator and said buffer to prevent said invalid micro-operations from being written to said buffer in response to assessing the state of the corresponding valid bits.

6. The processor of claim 5, wherein said offset generator includes an adder to generate said offsets in response to receiving said micro-operations.

7. The processor of claim 5, wherein said rotator includes a plurality of constituent sixteen-bit rotators, wherein each of said constituent sixteen bit rotators receives one of said offsets along a conductive media.

8. The processor of claim 7, wherein said logic circuit includes a plurality of logic gates, each of said logic gates being coupled between one of said constituent sixteen-bit rotators and each of said entries.

9. The processor of claim 5, wherein each of said entries includes at least one cell, said cell further including a latch that receives one bit from each of said addresses.

10. A filter comprising:
    an address generator coupled to receive a portion of each of a plurality of micro-operations, wherein each said portion is to indicate whether said micro-operation is a valid micro-operation;
    a logic circuit to generate a plurality of filter outputs, each of said filter outputs is to couple to a corresponding one of a plurality of storage devices, wherein each of said plurality of storage devices is coupled to receive said plurality of micro-operations in parallel, and each of said plurality of storage devices is responsive to an active state on said corresponding filter output to select any one of said received plurality of micro-operations to be stored; and
    wherein in response to an assessment of each said portion of each said received plurality of micro-operations, said plurality of filter outputs are selectively activated to store each said received valid micro-operation in a desired one of said plurality of storage devices.

11. The filter of claim 10, wherein said plurality of filter outputs are comprised of a plurality of decoded addresses, wherein each said valid micro-operation is associated with one of said plurality of decoded addresses, each said decoded address indicates one of said plurality of storage locations and each said filter output is comprised of one bit from each of said plurality of decoded addresses.

12. The filter of claim 10, wherein each said plurality of micro-operations is received by a latch within each said storage device, each said latch is responsive to a write enable to store said received micro-operation, and each said filter output is comprised of a plurality of signals that each couple to one of said write enables.

13. The filter of claim 10, wherein said address generator is to generate a plurality of addresses, wherein each of said plurality of addresses corresponds to one of said received micro-operations, and each of said plurality of addresses indicates one of said plurality of storage locations.

14. The filter of claim 13, wherein said address generator includes an offset generator to generate a plurality of offsets, each of said plurality of offsets corresponds to one of said received micro-operations.

15. The filter of claim 13, wherein said address generator further includes a rotator to be responsive to a head pointer and said plurality of offsets to generate said plurality of addresses.

16. The filter of claim 15, wherein said rotator includes a plurality of constituent rotators, each said constituent rotators receives one of said plurality of offsets and said head pointer to modularly add said received offset to said head pointer to generate one of said plurality of addresses.

17. The filter of claim 14, wherein said offset generator includes an adder coupled to receive said portion of each of said plurality of micro-operations to generate said plurality of offsets.

18. The filter of claim 13, wherein said logic circuit is coupled to receive said plurality of addresses and is coupled to receive said portion of each of said plurality of micro-operations to assess the state of said portion of each said received plurality of micro-operations.

19. The filter of claim 18, wherein said logic circuit is to selectively activate said filter outputs based on said assessment.

20. A method of filtering, said method comprising:

assessing the state of a portion of each of a plurality of received micro-operations, wherein each said portion indicates whether said micro-operation is a valid micro-operation;

activating selectively, based on said assessment, a plurality of outputs to be received by a plurality of storage devices, wherein each of said plurality of storage devices is coupled to receive said plurality of micro-operations in parallel, and each of said plurality of storage devices is responsive an active state on one of said plurality of outputs to select any one of said plurality of micro-operations to be stored; and storing each said valid micro-operations in a desired one of said plurality of storage devices.

21. The methods of claim 20, further comprising:

generating a plurality of decoded addresses in response to receiving a plurality of micro-operations, each said decoded address is associated with one of said received plurality of micro-operations, said decoded addresses indicate one of a plurality of said storage devices; and wherein said activating selectively, based on said assessment, a plurality of outputs, said outputs are selected based on said decoded addresses and on said assessment of each said portion of said received micro-operations.

22. A processor comprising:

a filter to generate a plurality of filter outputs, wherein said filter is to receive a plurality of micro-operations, wherein each said micro-operation includes a portion to indicate whether said micro-operation is a valid micro-operation;

a plurality of storage devices, each of said plurality of storage devices is coupled to receive a corresponding one of said filter outputs, each of said plurality of storage devices is coupled to receive said plurality of micro-operations in parallel, and each said storage device is responsive to an active state on said corresponding filter output to select any one of said received plurality of micro-operations to be stored; and wherein in response to assessing the state of each said portion of each said received plurality of micro-operations, said plurality of outputs are selectively activated to store each said received valid micro-operation in a desired one of said plurality of storage devices.

23. The processor of claim 22, wherein said plurality of filter outputs are comprised of a plurality of decoded addresses, each valid micro-operation is associated with one of said plurality of addresses, and each said filter output is comprised of one bit from each of said plurality of decoded addresses.

24. The processor of claim 22, wherein each said plurality of micro-operations are received by an associated latch within each said storage device, each said latch is responsive to a write enable to store said associated micro-operation, and each said filter output is comprised of a plurality of signals that each couple to one of said write enables.

25. The processor of claim 22, wherein said filter includes an address generator to generate a plurality of addresses each of said plurality of addresses corresponds to one of said received micro-operations, and each of said plurality of addresses indicates one of said plurality of storage locations.

26. The processor of claim 25, wherein said address generator includes an offset generator to generate a plurality of offsets, each of said plurality of offsets corresponds to one of said received micro-operations.

27. The processor of claim 26, wherein said address generator further includes a rotator to receive a head pointer and said plurality of offsets to generate said plurality of addresses.

28. The processor of claim 27, wherein said rotator includes a plurality of constituent rotators, each said constituent rotators receives one of said plurality of offsets and said head pointer to modularly add each said offset to said head pointer generate one of said plurality of addresses.

29. The processor of claim 26, wherein said offset generator includes an adder coupled to receive said portion of each of said plurality of micro-operations to generate said plurality of offsets.

30. The processor of claim 23, further comprising:

a logic circuit, coupled to receive said decoded addresses and coupled to receive said portions of each said plurality of micro-operations, to assess the state of said portions of each said plurality of micro-operations to filter select ones of said decoded addresses assessed to not be associated with a valid micro-operation.

* * * * *

UNITED STATES PATENT AND TRADEMARK OFFICE
CERTIFICATE OF CORRECTION

PATENT NO. : 6,292,882 B1  Page 1 of 1
DATED : September 18, 2001
INVENTOR(S) : Zaidi et al.

It is certified that error appears in the above-identified patent and that said Letters Patent is hereby corrected as shown below:

Column 6,
Line 2, delete "bead", insert -- head --.

Signed and Sealed this

Fourteenth Day of January, 2003

JAMES E. ROGAN
*Director of the United States Patent and Trademark Office*